US012626660B2

(12) United States Patent
Sun et al.

(10) Patent No.: US 12,626,660 B2
(45) Date of Patent: May 12, 2026

(54) PIXEL CIRCUIT COMPRISING A DRIVING TRANSISTOR THRESHOLD VOLTAGE COMPENSATION TRANSISTOR AND DRIVING METHOD THEREFOR

(71) Applicant: SEMICONDUCTOR INTEGRATED DISPLAY TECHNOLOGY CO., LTD., Wuhu City (CN)

(72) Inventors: Lin Sun, Wuhu City (CN); Shengfang Liu, Wuhu City (CN)

(73) Assignee: SEMICONDUCTOR INTEGRATED DISPLAY TECHNOLOGY CO., LTD., Wuhu City (CN)

( * ) Notice: Subject to any disclaimer, the term of this patent is extended or adjusted under 35 U.S.C. 154(b) by 0 days.

(21) Appl. No.: 18/936,468

(22) Filed: Nov. 4, 2024

(65) Prior Publication Data

US 2026/0057829 A1 Feb. 26, 2026

(30) Foreign Application Priority Data

Aug. 23, 2024 (CN) ......................... 202411168288.3

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/061* (2013.01); *G09G 2320/045* (2013.01)

(58) Field of Classification Search
CPC ......... G09G 3/3233; G09G 2300/0819; G09G 2300/0842; G09G 2310/061; G09G 2320/045
See application file for complete search history.

(56) References Cited

U.S. PATENT DOCUMENTS

2015/0310793 A1* 10/2015 Kawashima ............ G06F 3/044 345/174
2017/0270860 A1* 9/2017 Wang ................... G09G 3/3258
2021/0217364 A1* 7/2021 Wang ................... G09G 3/3291
2022/0310016 A1* 9/2022 Yang .................... G09G 3/3266
2023/0030745 A1* 2/2023 Sun ........................ H10D 86/60

(Continued)

FOREIGN PATENT DOCUMENTS

CN 108777130 A 11/2018
CN 111681604 A 9/2020

(Continued)

*Primary Examiner* — Nathan P Brittingham
(74) *Attorney, Agent, or Firm* — Meunier Carlin & Curfman LLC

(57) ABSTRACT

The present disclosure discloses a pixel circuit and a driving method therefor, including a data writing unit for controlling the input of data signals; an energy storage unit, the first end thereof is connected with the output end of the data writing unit, and used for storing the data signal output by the data writing unit; a light-emitting unit for luminous display; a first light-emitting control unit, the input end thereof is input a high-level VDD, the control end thereof is input a control signal, and the output end thereof is connected to the first end of the energy storage unit; a driving transistor, a gate thereof is connected to the second end of the energy storage unit, and the input end thereof is connected to the output of the first light-emitting control unit; a second light-emitting control unit; a compensation unit.

10 Claims, 4 Drawing Sheets

(56) References Cited

U.S. PATENT DOCUMENTS

| | | | | |
|---|---|---|---|---|
| 2023/0309341 | A1* | 9/2023 | Gao | G09G 3/3233 |
| 2024/0260321 | A1* | 8/2024 | Xu | H10K 59/353 |
| 2025/0029557 | A1* | 1/2025 | Li | G09G 3/3233 |

FOREIGN PATENT DOCUMENTS

| | | | |
|---|---|---|---|
| CN | 113674690 | A | 11/2021 |
| CN | 113808532 | A | 12/2021 |
| CN | 115691423 | A | 2/2023 |

* cited by examiner

PIXEL CIRCUIT COMPRISING A DRIVING TRANSISTOR THRESHOLD VOLTAGE COMPENSATION TRANSISTOR AND DRIVING METHOD THEREFOR

TECHNICAL FIELD

The disclosure herein relates to a technical field of display, especially to a pixel panel and a driving method therefor.

BACKGROUND

Organic Light Emitting Diode (OLED) is one of the hot spots in the current flat panel display research field. Compared with liquid crystal displays, the OLED has the advantages of low energy consumption, low production cost, self-illumination, wide viewing angle and fast response speed, and has begun to replace the traditional Liquid Crystal Display (LCD) in the field of flat panel displays such as mobile phones, PDAs, and digital cameras. Among them, the design of the drive circuit is the key technology to realize the display function.

The drive circuit can generally include a scanning drive circuit, a light-emitting control circuit, a data drive circuit, a pixel circuit, etc., among which the pixel circuit design is the core technical content of OLED display, which has important research significance.

With the development of display technology, people's requirements for display effects are getting higher and higher. However, due to the difference in the physical structure and electrical characteristics of semiconductor devices between different pixels, there is a threshold difference in the driving transistors in semiconductor devices, and the problem becomes more and more obvious as the size of the display panel increases, resulting in uneven display.

SUMMARY

In order to solve the problems existing in the prior art, the invention provides a pixel circuit and a driving method therefor.

The present disclosure provides a pixel circuit, including:

a data writing unit configured to control input of a data signal;

an energy storage unit, a first end of the energy storage unit being connected with an output end of the data writing unit, and the energy storage unit being configured to storage the data signal output by the data writing unit;

a light-emitting unit configured to emit light for display;

a first light-emitting control unit, an input end of the first light-emitting control unit being input a high-level VDD, a control end of the first light-emitting control unit being input a control signal, and an output end of the first light-emitting control unit being connected to the first end of the energy storage unit;

a driving transistor, a gate of the driving transistor being connected to a second end of the energy storage unit, and an input end of the driving transistor being connected to the output of the first light-emitting control unit;

a second light-emitting control unit, a control end of the second light-emitting control unit being input a light-emitting-enable signal, and an input end being connected to the output end of the driving transistor, and an output end being configured to provide a light-emitting current to the light-emitting unit;

a compensation unit, a first end of the compensation unit being connected to the second end of the energy storage unit, a second end of being connected to the output end of the driving transistor, and a control end of the compensation unit being input a compensation control signal.

In some embodiments, the pixel circuit further includes: a first reset unit, the first reset unit is connected to an input end of the light-emitting unit and is configured to reset the light-emitting unit.

In some embodiments, the pixel circuit, further includes: a second reset unit, the second reset unit is connected to the second end of the energy storage unit and is configured to reset the energy storage unit.

In some embodiments, the data writing unit includes a second P-channel Metal Oxide Semiconductor, PMOS transistor, and a source of the second PMOS transistor is input a data signal.

In some embodiments, the energy storage unit includes a capacitor, a first end of the energy storage unit is connected to a drain of the second PMOS transistor of the data writing unit.

In some embodiments, the first light-emitting control unit includes a first PMOS transistor, a source of the first PMOS transistor is input the high-level VDD, and a gate of the first PMOS transistor is input a control signal.

In some embodiments, the driving transistor is a silicon crystal MOS transistor.

In some embodiments, the second light-emitting control unit includes a fifth PMOS transistor, a source of the fifth PMOS transistor is connected to the drain of the driving transistor, and a gate of the fifth PMOS transistor is input the light-emitting-enable signal.

In some embodiments, the driving transistor is a silicon crystal PMOS transistor; the compensation unit includes a fourth PMOS transistor, a drain of the fourth PMOS transistor is connected to a second end of the capacitor, and a source of the fourth PMOS transistor is connected to the drain of the driving transistor, and a gate of the fourth PMOS transistor is input the compensation control signal.

In some embodiments, the first reset unit includes a sixth PMOS transistor, a drain of the sixth PMOS transistor is connected to the input end of the light-emitting unit, a gate of the sixth PMOS transistor is input a reset control signal, and a source of the sixth PMOS transistor is input a reset signal; the pixel circuit further includes a second reset unit; the second reset unit includes a third PMOS transistor, a drain of the third PMOS transistor is connected to the second end of the energy storage unit, a gate of the third PMOS transistor is input the reset control signal, and a source of the third PMOS transistor is input the reset signal.

In some embodiments, the first reset unit includes a third PMOS transistor, a drain of the third PMOS transistor is connected to the output end of the drive transistor, a gate of the third PMOS transistor is input a reset control signal, and a source of the third PMOS transistor is input a reset signal.

In some embodiments, the first reset unit includes a third PMOS transistor, a source of the third PMOS transistor is input a reset signal, a gate of the third PMOS transistor is input a reset control signal, and a drain of the third PMOS transistor is connect to the second end of the energy storage unit.

A driving method of the pixel circuit, including:

in an initialization phase, turning on the first reset unit and the second reset unit, turning off the first light-emitting control unit, the data writing unit, the compensation unit and the second light-emitting control unit, to initialize the energy storage unit and the light-emitting;

in a data writing phase, turning off the first light-emitting control unit, the compensation unit and the second light-emitting control unit, and turning on the data writing unit and the first reset unit and the second reset unit are opened, to writing data;

in a threshold voltage compensation phase, turning off the first light-emitting control unit, the second light-emitting control unit, the first reset unit and the second reset unit, and turning on the data writing unit and the compensation unit until $V_{data}-V_g=a*(VDD-V_{data})+|V_{th}|$, a is a substrate bias coefficient, $V_{data}$ is a gray level voltage, $V_g$ is the gate voltage of driving transistor, $|V_{th}|$ is a native threshold of driving transistor, VDD is substrate voltage of driving transistor; in a luminous phase, turning on the first light-emitting control unit and the second light-emitting control unit, and turning off the data writing unit, the compensation unit, the first reset unit and the second reset unit, $$I_{oled} = \beta*(V_{sg} - |V_{th}|)^2 = \beta*a^2*(VDD - V_{data})^2,$$

$$\beta = 0.5 \times u \times Cox \times \frac{W}{L},$$

U is a mobility, Cox is an oxide capacitance, W/L is an aspect ratio of the driving transistor.

A driving method of the pixel circuit, including:

in an initialization and data writing phase, turning off the first light-emitting control unit and the second light-emitting control unit, turning on the data writing unit, the compensation unit and the first reset unit, to initialize the energy storage unit and write data;

in a threshold voltage $V_{th}$ compensation phase, turning off the first light-emitting control unit, the second light-emitting control unit and the first reset unit, turning on the data writing unit and the compensation unit to write the data until $V_{data}-V_g=a*(VDD-V_{data})+|V_{th}|$, a is a substrate bias coefficient, $V_{data}$ is a gray level voltage, $V_g$ is the gate voltage of driving transistor, $|V_{th}|$ is a native threshold of driving transistor, VDD is substrate voltage of driving transistor;

in an anode initialization phase, turning off the first light-emitting control unit, the data writing unit and the compensation unit, and turning on the first reset unit and the second light-emitting control unit;

in a light-emitting phase, turning off the first reset unit, the data writing unit, and the compensation unit, and turning on the first light-emitting control unit and the second light-emitting control unit, $$I_{oled} = \beta*(V_{sg} - |V_{th}|)^2 = \beta*a^2*(VDD - V_{data})^2,$$

$$\beta = 0.5 \times u \times Cox \times \frac{W}{L},$$

U is a mobility, Cox is an oxide capacitance, W/L is an aspect ratio of the driving transistor.

A driving method of the pixel circuit, including:

in an anode initialization stage, turning off the first light-emitting control unit and the data writing unit, and turning on the compensation unit, the second light-emitting control unit and the first reset unit;

in a data writing phase, turning off the first light-emitting control unit, the second light-emitting control unit and the compensation unit, turning on the data writing unit and the first reset unit, to write data to the source of the driving transistor;

in a threshold voltage $V_{th}$ compensation phase, turning off the first light-emitting control unit, the first reset unit, and the second light-emitting control unit, and turning on the data writing unit and the compensation unit until $V_{data}-V_g=a*(VDD-V_{data})+|V_{th}|$, a is a substrate bias coefficient;

in a light-emitting phase, turning off the first reset unit, the data writing unit, and the compensation unit, and turning on the first light-emitting control unit and the second light-emitting control unit, $$I_{oled} = \beta*(V_{sg} - |V_{th}|)^2 = \beta*a^2*(VDD - V_{data})^2,$$

$$\beta = 0.5 \times u \times Cox \times \frac{W}{L},$$

U is a mobility, Cox is an oxide capacitance, W/L is an aspect ratio of the driving transistor.

BRIEF DESCRIPTION OF FIGURES

In order to more clearly illustrate the technical solutions in the embodiments of the present disclosure, the drawings that need to be used in the description of the embodiments will be briefly introduced below, and it is obvious that the drawings described below are only some embodiments of the present disclosure, and for those skilled in the art, other drawings can be obtained according to these drawings without creative labor.

DETAILED DESCRIPTION

Figure 1:
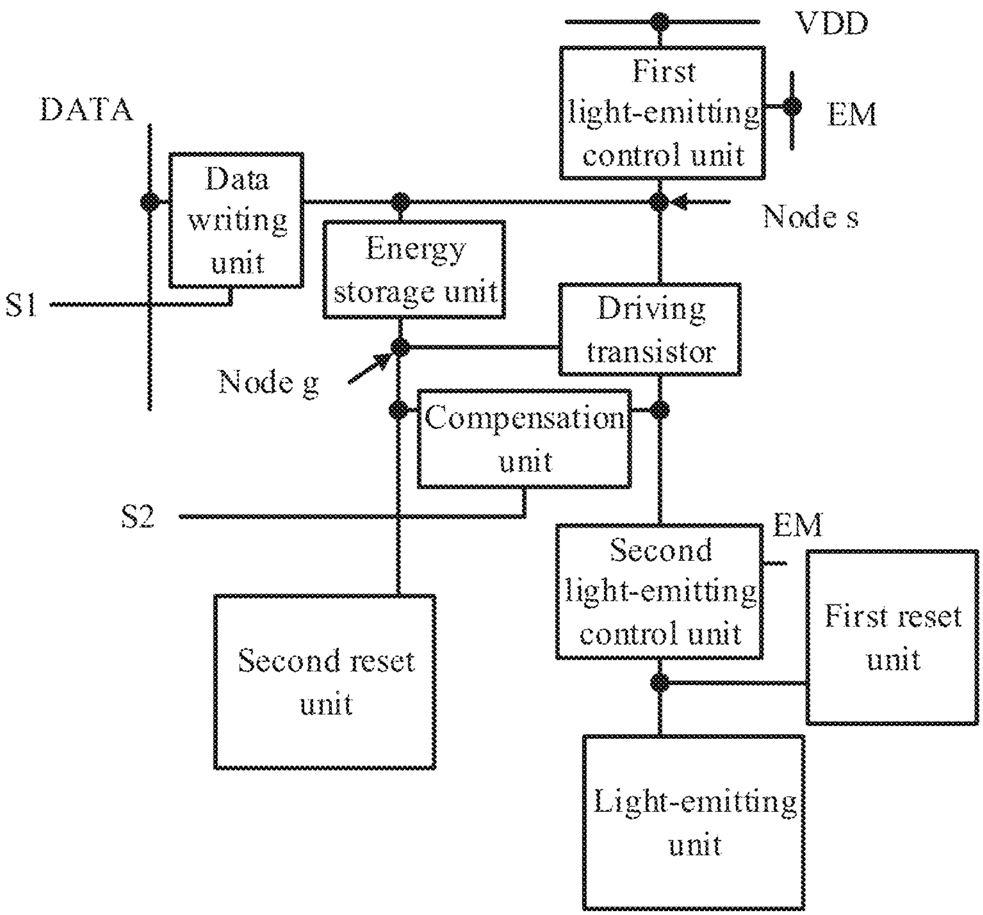
FIG. 1 is a schematic diagram of the structure of the pixel circuit of an embodiment of the present disclosure.

The preferred embodiment of the present disclosure is described in more detail below. Although the preferred embodiments of the present disclosure are described below, it should be understood that the present disclosure can be realized in various forms and should not be limited by the embodiments set forth herein.

In the present disclosure, in the absence of a statement to the contrary, the use of directional words such as "up", "down" usually refers to the upper and lower parts of the device in normal use, and "inside" and "outside" refers to the contour of the device. In addition, the terms "first", "second", "third" are used for descriptive purposes only and cannot be construed as indicating or implying relative importance or implying the number of technical features indicated. Thus, defining the "first", "second", and "third"

features may explicitly or implicitly include one or more of the features. In the description of the present disclosure, "plurality" means two or more of them, unless otherwise expressly and specifically qualified. The present disclosure relates to electrical devices, so connection, interconnection all mean conductive interconnection. Since the drawings are descriptions of the same device, the same designation in the drawings indicates the same part.

The specific examples of the present disclosure are further described in detail below in conjunction with the accompanying drawings. FIG. 1 is a schematic diagram of the structure of the pixel circuit of an embodiment of the present disclosure, as shown in FIG. 1, the pixel circuit includes:

a data writing unit configured to control the input of data signals; an energy storage unit, of which the first end is connected with the output end of the data writing unit, and is configured to store the data output by the data writing unit; a light-emitting unit is configured to emit light for display; a first light-emitting control unit, of which an input end is connected to the high-level VDD, a control end is input a control signal, and an output end is connected to the first end of the energy storage unit; a driving transistor, of which a gate is connected to the second end of the energy storage unit, and an input end is connected to the output end of the first light-emitting control unit; a second light-emitting control unit, of which a control end is input a control signal, an input end is connected with the output end of the driving transistor, and an output end is configured to provide a light-emitting current to the light-emitting unit; a compensation unit, of which the first end is connected to the second end of the energy storage unit, the second end is connected to the output end of the driving transistor, and a control end is input a compensation control signal.

Figure 2:
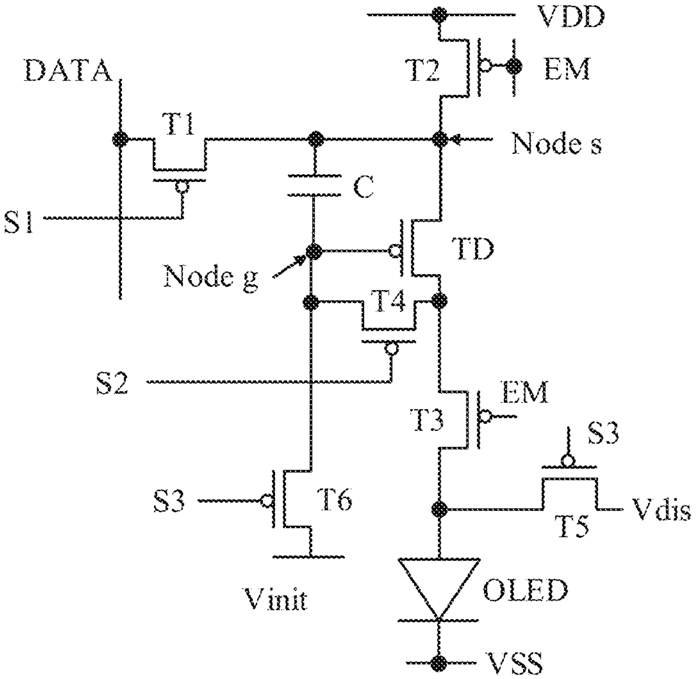
FIG. 2 is a circuit diagram of the pixel circuit of the first embodiment of the present disclosure.

FIG. 2 is a circuit diagram of the pixel circuit of the first embodiment of the present disclosure, in which S1 is the data control signal;

S2 is the compensation control signal;

S3 is a connection-reset control signal;

EM is the control signal and the light-emitting-enable signal.

As shown in FIG. 2, in this embodiment, the pixel circuit further includes a first reset unit. The first reset unit is connected to the input end of the light-emitting unit and configured to reset the light-emitting unit.

In this embodiment, the pixel circuit further includes a second reset unit. The second reset unit is connected to the second end of the energy storage unit and configured to reset the energy storage unit.

In this embodiment, the data writing unit includes: a first P-channel Metal Oxide Semiconductor, PMOS transistor T1, of which a source is connect to the data signal DATA, and a gate is input a data control signal S1.

In this embodiment, the energy storage unit includes a capacitor C, of which the first end is connected to a drain of the first PMOS transistor T1 the data writing unit.

In this embodiment, the first light-emitting control unit includes a second PMOS transistor T2, of which a source is connected to a high-level VDD, and a gate is connected with the control signal EM.

In this embodiment, the driving transistor TD is a silicon-based MOS transistor, preferably a PMOS transistor. In other embodiments, the driving transistor TD can also be other semiconductor substrates, so that the bias effect can be better combined with the present disclosure to achieve the improvement of the effect.

In this embodiment, the second light-emitting control unit includes a third PMOS transistor T3, of which a source is connected to the drain of the driving transistor TD, a gate is connected to the control signal EM, and a drain is connected to the input end of the light-emitting unit.

In this embodiment, the compensation unit includes a fourth PMOS transistor T4, of which a drain is connected to the second end of the capacitor C, a source is connected to the drain of the drive transistor TD, and a gate is connect to the compensation control signal S2.

In this embodiment, the first reset unit includes a fifth PMOS transistor T5, of which a drain is connected to the input end of the light-emitting unit, a gate is connected to the reset control signal S3, and a source is input a reset signal Vdis. The pixel circuit further includes a second reset unit. The second reset unit includes a sixth PMOS transistor T6, of which a drain is connected to the second end of the energy storage unit, a gate is connect to the reset control signal S3, and a source is input a reset signal Vinit.

In other embodiments, the specific structure of the above-mentioned units may also be selected in various combinations, all within the scope of the present disclosure, and the circuit in the present embodiment does not constitute a specific limitation. Among them, the driving transistor is preferably a silicon-based MOS transistor, and other circuits are not limited, which can be silicon-based or glass-based devices, can be made with the driving transistor in a silicon-based chip, or can be a package combination of other separate structures.

As shown in FIG. 2, in the embodiment, the pixels of the scheme include 7T1C (7 transistors and 1 capacitor). The source and drain of the second PMOS transistor T2 are respectively connected to the VDD wiring and the source S of the driving transistor TD. The upper and lower substrates of the capacitor C are respectively connected to the source and gate of the driving transistor TD. The source of the first PMOS transistor T1 is input the data signal DATA, and the drain of the first PMOS transistor T1 is connected with the source of the driving transistor TD. The source of the sixth PMOS transistor T6 is connected to the gate of the driving transistor, and the drain of the sixth PMOS transistor T6 is input the reset signal Vini. The source and drain of the fourth PMOS transistor T4 are connected to the drain and gate of driving transistor TD respectively. The source and drain of the third PMOS transistor T3 are connected to the drain of the driving transistor TD and the anode of OLED respectively. The source of the fifth PMOS transistor T5 is input the reset signal Vdis, and the drain of the fifth PMOS transistor T5 is connected with the anode of OLED.

The present disclosure further provides a driving method for a pixel circuit, including followings:

in the initialization phase, the first reset unit and the second reset unit are turned on, the first light-emitting control unit, the data writing unit, the compensation unit and the second light-emitting control unit are turned off, and the energy storage unit and the light-emitting unit are initialized;

in the data writing phase, the first light-emitting control unit, the compensation unit and the second light-emitting control unit are turned off, and the data writing unit, the first reset unit and the second reset unit are turned on, and data is written;

in the threshold voltage compensation phase, the first light-emitting control unit, the second light-emitting control unit, the first reset unit and the second reset unit are turned off, and the data writing unit and the compensation unit are turned on until $V_{data}-V_g=a*(VDD-$ $V_{data}$)+|$V_{th}$|, a is the substrate bias coefficient, $V_{data}$ is a gray level voltage, $V_g$ is the gate voltage of driving transistor, |$V_{th}$| is a native threshold of driving transistor, VDD is substrate voltage of driving transistor;

in the light-emitting phase, the first light-emitting control unit and the second light-emitting control unit are turned on, and the data writing unit, the compensation unit and the first reset unit and the second reset unit are turned off.

$$I_{oled} = \beta * (V_{sg} - |V_{th}|)^2 = \beta * a^2 * (VDD - V_{data})^2,$$

$$\beta = 0.5 \times u \times Cox \times \frac{W}{L},$$

U is a mobility, Cox is an oxide capacitance, W/L is an aspect ratio of the driving transistor.

Figure 3:
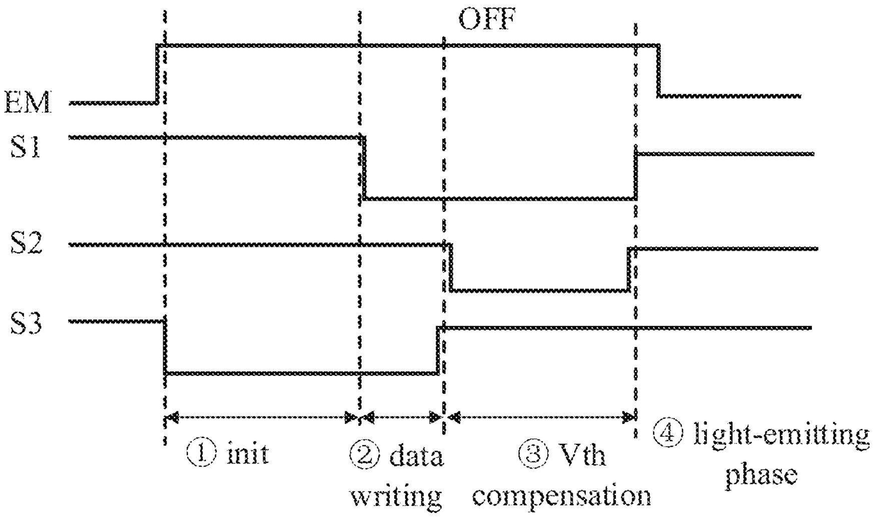
FIG. 3 is a timing diagram of the driving method of the pixel circuit shown in FIG. 2.

FIG. 3 is a timing diagram of the driving method of the pixel circuit shown in FIG. 2. The driving method of the pixel circuit shown in FIG. 2 is illustrated below in combination with the specific working process.

Combined with the corresponding timing of FIG. 3, the working process of this scheme is given.

First, in the initialization (init) phase (1), the first PMOS transistor T1, the second PMOS transistor T2, the fourth PMOS transistor T4, and the third PMOS transistor T3 are turned off, the sixth PMOS transistor T6 and the fifth PMOS transistor T5 are turned on, the g point (Node g) voltage: $V_g$=Vinit, and the light-emitting unit is input the terminal voltage: $V_{oled}$=Vdis.

After that, entering the data writing phase (2), the second PMOS transistor T2, the fourth PMOS transistor T4 and the third PMOS transistor T3 are closed, the first PMOS transistor T1, the sixth PMOS transistor T6 and the fifth PMOS transistor T5 are turned on, and the data DATA is written to the S point (Node S), $V_s$=$V_{data}$, $V_g$=Vinit.

After that, entering the threshold voltage $V_{th}$ compensation phase (3), the second PMOS transistor T2, the sixth PMOS transistor T6, the third PMOS transistor T3 and the fifth PMOS transistor T5 are turned off, the first PMOS transistor T1 and the fourth PMOS transistor T4 are turned on, and a current is written to the Node g through the driving the transistor TD. The current becomes smaller and smaller until $V_{data}$–$V_g$=a(VDD–$V_{data}$)+|$V_{th}$|, a is the substrate bias coefficient.

Then entering the light-emitting phase. The first PMOS transistor T1, the sixth PMOS transistor T6, the fourth PMOS transistor T4 and the fifth PMOS transistor T5 are turned off, the second PMOS transistor T2 and the third PMOS transistor T3 are turned on, and the voltage difference between the S point and the g point $V_s$g is the same as (3);

$$I_{oled} = \beta * (V_{sg} - |V_{th}|)^2 = \beta * a^2 * (VDD - V_{data})^2,$$

$$\beta = 0.5 \times u \times Cox \times \frac{W}{L},$$

U is a mobility, Cox is an oxide capacitance, W/L is an aspect ratio of the driving transistor.

As can be seen from the above equation, the light-emitting current of OLED is independent of the threshold voltage of the driving transistor TD, thus eliminating the influence of the threshold voltage difference on the display.

The second embodiment.

Figure 4:
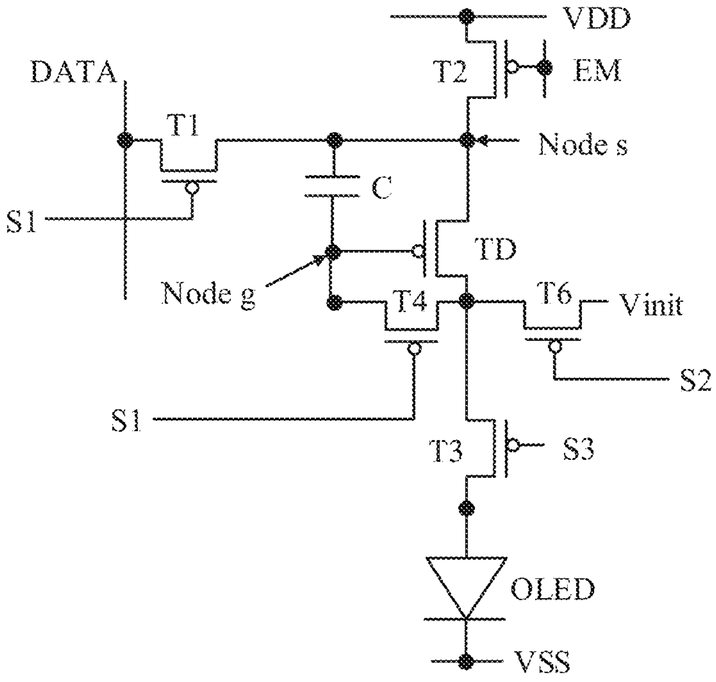
FIG. 4 is the circuit diagram of the pixel circuit of the second embodiment of the present disclosure.

As shown in FIG. 4, the present embodiment is not repeated in the same part as the first embodiment, except that: the fifth PMOS transistor T5 is removed, and the source of the sixth PMOS transistor T6 is input the reset signal Vinit and drain of the sixth PMOS transistor T6 is connected to the drain of the driving transistor TD.

The first reset unit includes: the sixth PMOS transistor, of which a drain is connected to the output end of the drive transistor, and the gate is input the reset control signal, and the source is input the reset signal.

S1 is a data control signal and a compensation control signal;

S2 is the reset control signal;

S3 is the light-emitting-enable signal;

EM is the control signal.

The disclosure further provides another driving method for a pixel circuit, including following steps:

in the initialization and data writing phase, the first light-emitting control unit, the second light-emitting control unit are turned off, the data writing unit, the compensation unit and the first reset unit are turned on, and the energy storage unit is initialized and is input data;

in the threshold voltage $V_{th}$ compensation phase, the first light-emitting control unit, the second light-emitting control unit and the first reset unit are turned off, the data writing unit and the compensation unit are turned on, and the data is written until $V_{data}$–$V_g$=a(VDD–$V_{data}$)+|$V_{th}$|, a is the substrate bias coefficient, VDD is a gate substrate voltage of the driving transistor, $V_{data}$ is a gray level voltage, $V_g$ is a gate voltage of the driving transistor, $V_{th}$ is a native threshold of the driving transistor;

in the anode initialization phase, the first light-emitting control unit, the data writing unit and the compensation unit are turned off, and the first reset unit and the second light-emitting control unit are turned on;

in the light-emitting phase, the first reset unit, the data writing unit and the compensation unit are turned off, and the first light-emitting control unit and the second light-emitting control unit are turned on;

$$I_{oled} = \beta * (V_{sg} - |V_{th}|)^2 = \beta * a^2 * (VDD - V_{data})^2,$$

$$\beta = 0.5 \times u \times Cox \times \frac{W}{L},$$

U is a mobility, Cox is an oxide capacitance, W/L is an aspect ratio of the driving transistor.

Figure 5:
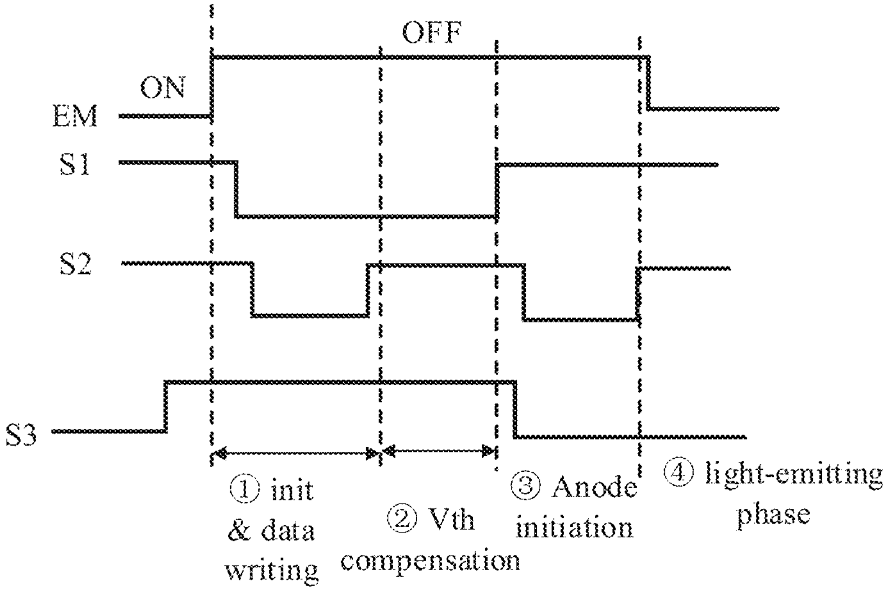
FIG. 5 is a timing diagram of the driving method of the pixel circuit shown in FIG. 4.

FIG. 5 is a timing diagram of the driving method of the pixel circuit shown in FIG. 4, and the driving method of the pixel-circuit shown in FIG. 4 is illustrated below in conjunction with the specific working process.

Combined with the corresponding timing of FIG. 5, the working process of this scheme is given as followings.

First, in the initialization (init) and data writing phase (1), the second PMOS transistor T2 and the third PMOS transistor T3 are turned off, the first PMOS transistor T1, the sixth PMOS transistor T6 and the fourth PMOS transistor T4 are turned on:

$$V_s = V_{data},\ V_g = Vinit.$$

After that, entering the data writing and threshold voltage $V_{th}$ compensation phase (2), the second PMOS transistor T2, the sixth PMOS transistor T6 and the third PMOS transistor T3 are turned off, the first PMOS transistor T1 and the fourth PMOS transistor T4 are turned on, and the data signal DATA is written to the S point (Node S), and the voltage at the S point is: $V_s=V_{data}$. A current is written to the Node g through the driving transistor TD until $V_{data}-V_g=a*(VDD-V_{data})+|V_{th}|$, a is the substrate bias coefficient, VDD is a gate substrate voltage of the driving transistor, $V_{data}$ is a gray level voltage, $V_g$ is a gate voltage of the driving transistor, $V_{th}$ is a native threshold of the driving transistor.

After that, entering the anode initialization phase (3), the first PMOS transistor T1, the second PMOS transistor T2 and the fourth PMOS transistor T4 are turned off, the sixth PMOS transistor T6 and the third PMOS transistor T3 are turned on, and the anode voltage of the light-emitting unit $V_{oled}$=Vinit.

Then enter the light-emitting phase (4), the sixth PMOS transistor T6, the first PMOS transistor T1 and the fourth PMOS transistor T4 are turned off, the second PMOS transistor T2 and the third PMOS transistor T3 are turned on, and the voltage difference between the S point and the g point $V_{sg}$ is the same as (2);

$$I_{oled}=\beta*(V_{sg}-|V_{th}|)^2=\beta*a^2*(VDD-V_{data})^2,$$

$$\beta=0.5\times u\times Cox\times\frac{W}{L},$$

U is a mobility, Cox is an oxide capacitance, W/L is an aspect ratio of the driving transistor.

From the above equation, it can be seen that the light-emitting current of OLED in this scheme is also independent of the threshold voltage of TD, so as to eliminate the influence of the threshold voltage difference on the display.

The Third Embodiment

Figure 6:
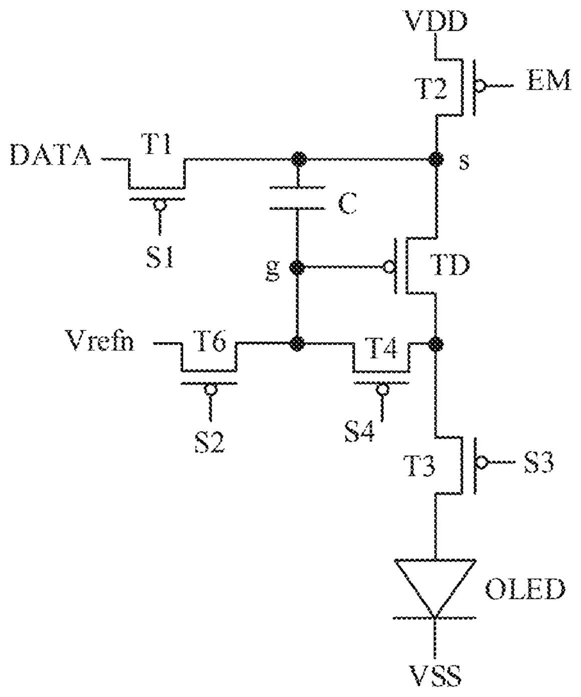
FIG. 6 is the circuit diagram of the pixel circuit of the third embodiment of the present disclosure.

As shown in FIG. 6, the present embodiment is not repeated in the same part as the first embodiment, except that: the pixel circuit includes 6T1C (6 transistors and 1 capacitor), and the source and drain of the sixth POS transistor T6 are connected to Vrefn and g points respectively.

The first reset unit include the sixth PMOS transistor, of which the source is input the reset signal, the gate is input the reset control signal, and the drain is connected to the second end of the energy storage unit.

S1 is the data control signal;

S2 is the reset control signal;

S3 is the light-emitting-enable signal;

S4 is the compensation control signal;

EM is the control signal.

The disclosure further provides another driving method for a pixel circuit, including following steps.

In the anode initialization phase, the first light-emitting control unit and the data writing unit are turned off, and the compensation unit, the second light-emitting control unit and the first reset unit are turned on.

In the data writing phase, the first light-emitting control unit, the second light-emitting control unit and the compensation unit are turned off, the data writing unit and the first reset unit are turned on, and the data is written to the source of the driving transistor.

In the threshold voltage $V_{th}$ compensation phase, the first light-emitting control unit, the first reset unit, and the second light-emitting control unit are turned off, and the data writing unit and the compensation unit are turned on until $V_{data}-V_g=a*(VDD-V_{data})+|V_{th}|$, a is the substrate bias coefficient, VDD is a gate substrate voltage of the driving transistor, $V_{data}$ is a gray level voltage, $V_g$ is a gate voltage of the driving transistor, $V_{th}$ is a native threshold of the driving transistor.

In the light-emitting phase, the first reset unit, the data writing unit and the compensation unit are turned off, and the first light-emitting control unit and the second light-emitting control unit are turned on;

$$I_{oled}=\beta*(V_{sg}-|V_{th}|)^2=\beta*a^2*(VDD-V_{data})^2,$$

$$\beta=0.5\times u\times Cox\times\frac{W}{L},$$

U is a mobility, Cox is an oxide capacitance, W/L is an aspect ratio of the driving transistor.

Figure 7:
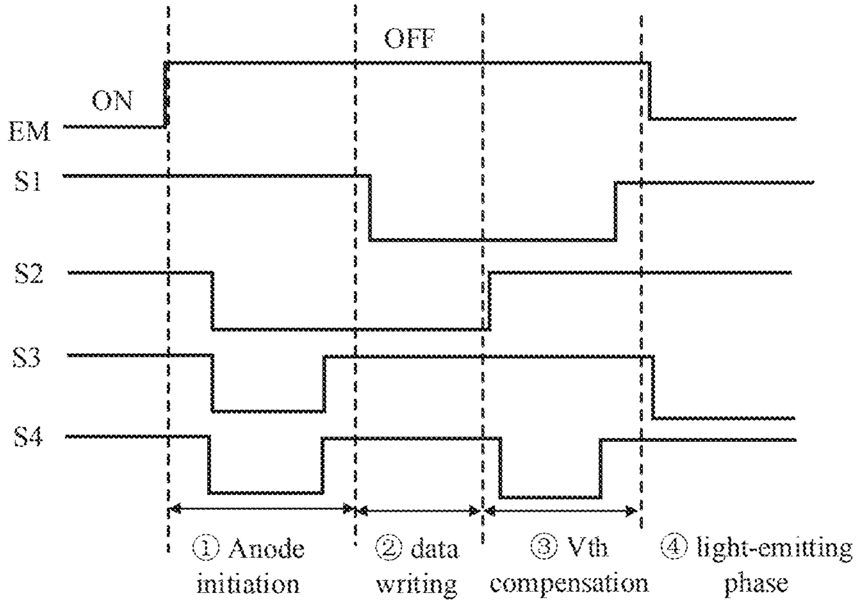
FIG. 7 is a timing diagram of the driving method of the pixel circuit shown in FIG. 6.

FIG. 7 is a timing diagram of the driving method of the pixel circuit shown in FIG. 6, and the driving method of the pixel circuit shown in FIG. 6 is illustrated below in conjunction with the specific working process.

Combined with the corresponding timing of FIG. 7, the working process of this scheme is given as followings.

First, in the anode initialization phase (1), the first PMOS transistor T1 and the second PMOS transistor T2 are turned off, the sixth PMOS transistor T6, the fourth PMOS transistor T4 and the third PMOS transistor T3 are turned on to initialize the anode.

After that, entering the data writing phase (2), the second PMOS transistor T2, the fourth PMOS transistor T4 and the third PMOS transistor T3 are turned off, the first PMOS transistor T1 and the sixth PMOS transistor T6 are turned on, and $V_{data}$ is written to the source of the driving transistor TD.

After that, entering the threshold voltage $V_{th}$ compensation phase (3), the second PMOS transistor T2, the sixth PMOS transistor T6 and the third PMOS transistor T3 are turned off, the first PMOS transistor T1 and the fourth PMOS transistor T4 are turned on, and a current is written to the Node g through the driving transistor TD until $V_{data}-V_g=a*(VDD-V_{data})+|V_{th}|$, a is the substrate bias coefficient, VDD is a gate substrate voltage of the driving transistor, $V_{data}$ is a gray level voltage, $V_g$ is a gate voltage of the driving transistor, $V_{th}$ is a native threshold of the driving transistor.

Then entering the light-emitting phase (4), the sixth PMOS transistor T6, the first PMOS transistor T1, and the fourth PMOS transistor T4 are turned off, the second PMOS transistor T2 and the third PMOS transistor T3 are turned on, and the voltage difference between the S point and the g point $V_sg$ is the same as (3);

$$I_{oled}=\beta*(V_{sg}-|V_{th}|)^2=\beta*a^2*(VDD-V_{data})^2,$$

$$\beta=0.5\times u\times Cox\times\frac{W}{L},$$

U is a mobility, Cox is an oxide capacitance, W/L is an aspect ratio of the driving transistor.

As can be seen from the above equation, the light-emitting current of OLED is independent of the threshold voltage of the driving transistor TD, thus eliminating the influence of the threshold voltage difference on the display.

The present disclosure utilizes a silicon-based MOS transistor as a driver transistor, on the one hand, compared with a thin-film transistor, there will be a bias effect, that is, the existence of the substrate bias coefficient makes the final current expression of the light-emitting unit of the present disclosure as $I_{oled}=\beta*(V_{sg}-|V_{th}|)^2=\beta*a^2*(VDD-V_{data})^2=0.5*u*Cox(W/L)*a^2(VDD-V_{data})^2$, u is the mobility, Cox is the oxide capacitance, W/L is the aspect ratio of the driving transistor.

It can be seen that the final expression of the present disclosure contains $a^2$ (the substrate bias coefficient, usually between 0~1), and the existence of this coefficient is conducive to expanding the range of $V_{data}$ voltage, thereby facilitating the expansion of the gray scale voltage of the panel.

The above are only embodiments of the present disclose, and do not limit the scope of the present disclosure, and all equivalent structural or equivalent process transformations made by using the contents of the description and drawings of the present disclosure, such as the combination of technical features between the embodiments, or the direct or indirect application in other related technical fields, are similarly included in the scope of protection of the present disclosure.

What is claimed is:

1. A pixel circuit, comprising:

a data writing unit configured to control input of a data signal;

an energy storage unit, a first end of the energy storage unit being connected with an output end of the data writing unit, and the energy storage unit being configured to store the data signal output by the data writing unit;

a light-emitting unit configured to emit light for display;

a first light-emitting control unit, an input end of the first light-emitting control unit being connected to a high level, a control end of the first light-emitting control unit being input a control signal, and an output end of the first light-emitting control unit being connected to the first end of the energy storage unit;

a driving transistor, a gate of the driving transistor being connected to a second end of the energy storage unit, and an input end of the driving transistor being connected to the output end of the first light-emitting control unit;

a second light-emitting control unit, a control end of the second light-emitting control unit being input with a light-emitting-enable signal, and an input end of the second light-emitting control unit being connected to an output end of the driving transistor, and an output end of the second light-emitting control unit being configured to provide a light-emitting current to the light-emitting unit;

a compensation unit, a first end of the compensation unit being connected to the second end of the energy storage unit, a second end of the compensation unit being connected to the output end of the driving transistor, and a control end of the compensation unit being input with a compensation control signal;

wherein the driving transistor is a silicon crystal PMOS transistor;

wherein the compensation unit comprises a fourth PMOS transistor, a drain of the fourth PMOS transistor is connected to a second end of the energy storage unit, and a source of the fourth PMOS transistor is connected to the drain of the driving transistor, and a gate of the fourth PMOS transistor is connected to the compensation control signal;

wherein a first reset unit comprises a fifth PMOS transistor, a drain of the fifth PMOS transistor is connected to the input end of the light-emitting unit, a gate of the fifth PMOS transistor is input with a reset control signal, and a source of the fifth PMOS transistor is connected to a reset signal;

wherein the pixel circuit further comprises a second reset unit;

the second reset unit comprises a sixth PMOS transistor, a drain of the sixth PMOS transistor is connected to the second end of the energy storage unit, a gate of the sixth PMOS transistor is input with the reset control signal, and a source of the sixth PMOS transistor is input with the reset signal;

or the first reset unit comprises a sixth PMOS transistor, a drain of the sixth PMOS transistor is connected to the output end of the drive transistor, a gate of the sixth PMOS transistor is input with a reset control signal, and a source of the sixth PMOS transistor is input with a reset signal.

2. The pixel circuit of claim 1, further comprising: the first reset unit, wherein the first reset unit is connected to an input end of the light-emitting unit and is configured to reset the light-emitting unit.

3. The pixel circuit of claim 2, further comprising: the second reset unit, wherein the second reset unit is connected to the second end of the energy storage unit and is configured to reset the energy storage unit.

4. The pixel circuit of claim 2, wherein the data writing unit comprises a first P-channel Metal Oxide Semiconductor (PMOS) transistor, and a source of the first PMOS transistor is connected to the data signal.

5. The pixel circuit of claim 4, wherein the energy storage unit comprises a capacitor, a first end of the capacitor is connected to a drain of the first PMOS transistor of the data writing unit.

6. The pixel circuit of claim 5, wherein the first light-emitting control unit comprises a second PMOS transistor, a source of the second PMOS transistor is connected to the high level, and a gate of the second PMOS transistor is connected to the control signal.

7. The pixel circuit of claim 6, wherein the second light-emitting control unit comprises a third PMOS transistor, a source of the third PMOS transistor is connected to a drain of the driving transistor, and a gate of the third PMOS transistor is connected to the light-emitting-enable signal.

8. A driving method of the pixel circuit of claim 1, comprising:

in an initialization phase, turning on the first reset unit and the second reset unit, turning off the first light-emitting control unit, the data writing unit, the compensation unit and the second light-emitting control unit, to initialize the energy storage unit and the light-emitting unit;

in a data writing phase, turning off the first light-emitting control unit, the compensation unit and the second light-emitting control unit, and turning on the data writing unit, the first reset unit and the second reset unit, to write data;

in a threshold voltage compensation phase, turning off the first light-emitting control unit, the second light-emitting control unit, the first reset unit and the second reset unit, and turning on the data writing unit and the compensation unit until $V_{data}-V_g=a*(VDD-V_{data})+|V_{th}|$, wherein a is a substrate bias coefficient, VDD is a gate substrate voltage of the driving transistor, $V_{data}$ is a gray level voltage, $V_g$ is a gate voltage of the driving transistor, $V_{th}$ is a native threshold of the driving transistor;

in a light-emitting phase, turning on the first light-emitting control unit and the second light-emitting control unit, and turning off the data writing unit, the compensation unit, the first reset unit and the second reset unit, $I_{oled}=\beta*(V_{sg}-|V_{th}|)^2=\beta*a^2*(VDD-V_{data})^2$, wherein $I_{oled}$ is a light-emitting current of the light-emitting unit, $V_{sg}$ is a voltage difference between a node S and the node g, $$\beta = 0.5 \times u \times Cox \times \frac{W}{L},$$

U is a mobility, Cox is an oxide capacitance, W/L is an aspect ratio of the driving transistor.

9. A driving method of the pixel circuit of claim 1, comprising:

in an initialization and data writing phase, turning off the first light-emitting control unit and the second light-emitting control unit, turning on the data writing unit, the compensation unit and the first reset unit, to initialize the energy storage unit and write data;

in a threshold voltage $V_{th}$ compensation phase, turning off the first light-emitting control unit, the second light-emitting control unit and the first reset unit, turning on the data writing unit and the compensation unit, to write the data until $V_{data}-V_g=a*(VDD-V_{data})+|V_{th}|$, wherein a is a substrate bias coefficient, VDD is a gate substrate voltage of the driving transistor, $V_{data}$ is a gray level voltage, $V_g$ is a gate voltage of the driving transistor, $V_{th}$ is a native threshold of the driving transistor;

in an anode initialization phase, turning off the first light-emitting control unit, the data writing unit and the compensation unit, and turning on the first reset unit and the second light-emitting control unit;

in a light-emitting phase, turning off the first reset unit, the data writing unit, and the compensation unit, and turning on the first light-emitting control unit and the second light-emitting control unit, $I_{oled}=\beta*(V_{sg}-|V_{th}|)^2=\beta*a^2*(VDD-V_{data})^2$, wherein $I_{oled}$ is a light-emitting current of the light-emitting unit, $V_{sg}$ is a voltage difference between a node S and the node g, $$\beta = 0.5 \times u \times Cox \times \frac{W}{L},$$

U is a mobility, Cox is an oxide capacitance, W/L is an aspect ratio of the driving transistor.

10. A driving method of the pixel circuit of claim 1, comprising:

in an anode initialization stage, turning off the first light-emitting control unit and the data writing unit, and turning on the compensation unit, the second light-emitting control unit and the first reset unit;

in a data writing phase, turning off the first light-emitting control unit, the second light-emitting control unit and the compensation unit, turning on the data writing unit and the first reset unit, to write data to the source of the driving transistor;

in a threshold voltage $V_{th}$ compensation phase, turning off the first light-emitting control unit, the first reset unit, and the second light-emitting control unit, and turning on the data writing unit and the compensation unit until $V_{data}-V_g=a*(VDD-V_{data})+|V_{th}|$, wherein a is a substrate bias coefficient, VDD is a gate substrate voltage of the driving transistor, $V_{data}$ is a gray level voltage, $V_g$ is a gate voltage of the driving transistor, $V_{th}$ is a native threshold of the driving transistor;

in a light-emitting phase, turning off the first reset unit, the data writing unit, and the compensation unit, and turning on the first light-emitting control unit and the second light-emitting control unit, $I_{oled}=\beta*(V_{sg}-|V_{th}|)^2=\beta*a^2*(VDD-V_{data})^2$, wherein $I_{oled}$ is a light-emitting current of the light-emitting unit, $V_{sg}$ is a voltage difference between a node S and the node g, $$\beta = 0.5 \times u \times Cox \times \frac{W}{L},$$

U is a mobility, Cox is an oxide capacitance, W/L is an aspect ratio of the driving transistor.

* * * * *